United States Patent [19]
Kim et al.

[11] Patent Number: 5,850,271
[45] Date of Patent: Dec. 15, 1998

[54] COLOR FILTER SUBSTRATE FOR A LIQUID CRYSTAL DISPLAY AND A METHOD FOR MANUFACTURING THE SAME

[75] Inventors: Sang-soo Kim, Seoul; Jin-kwan Kim, Suwon; Woon-yong Park, Suwon; Dong-gyu Kim, Suwon; Joong-hee Lee, Seoul, all of Rep. of Korea

[73] Assignee: Samsung Electronics Co., Ltd., Kyungki-Do, Rep. of Korea

[21] Appl. No.: 554,046

[22] Filed: Nov. 6, 1995

[30] Foreign Application Priority Data

Nov. 4, 1994 [KR] Rep. of Korea ........... 1994-28921
Sep. 12, 1995 [KR] Rep. of Korea ........... 1995-29698

[51] Int. Cl.$^6$ ........................................ G02F 1/1335
[52] U.S. Cl. ........................... 349/111; 349/106
[58] Field of Search .................... 349/111, 106, 349/110

[56] References Cited

U.S. PATENT DOCUMENTS

| | | |
|---|---|---|
| 4,687,298 | 8/1987 | Aoki et al. ............... 349/111 |
| 4,853,296 | 8/1989 | Fukuyoshi ............... 349/111 |
| 5,045,418 | 9/1991 | Fukuyoshi ............... 349/111 |
| 5,365,357 | 11/1994 | Ohgawara et al. ....... 349/111 |
| 5,400,157 | 3/1995 | Won ....................... 349/111 |
| 5,666,177 | 9/1997 | Hsieh et al. ............. 349/111 |

*Primary Examiner*—William L. Sikes
*Assistant Examiner*—James Dudek
*Attorney, Agent, or Firm*—Pillsbury Madison & Sutro LLP

[57] ABSTRACT

A color filter substrate for a liquid crystal display device is obtained by patterning color filters on a transparent substrate, selective-coating an overcoat layer on the substrate, and forming a common electrode and a black matrix to be connected each other, without any further step. This color filter substrate compensates a high sheet resistance of the common electrode and reduces a crosstalk and a surface reflection rate of the panel. In addition, the black matrix is formed on the color filters, and thus the reduction of the resistance of the common electrode is available. A process for forming the ITO layer on the black matrix is only required as an additional process, so that the step coverage is improved and thus no polyimide-off phenomenon is resulted during the rubbing process, while improving poor quality pixels which may be produced by the light leak and the polyimide-off.

22 Claims, 6 Drawing Sheets

COLOR FILTER SUBSTRATE FOR A LIQUID CRYSTAL DISPLAY AND A METHOD FOR MANUFACTURING THE SAME

BACKGROUND OF THE INVENTION

The present invention relates in general to a color filter substrate for a liquid crystal display device and a method for manufacturing the same, and more particularly to a color filter having a black matrix electrically connected to a common electrode, which reduces resistance of the common electrode, enhances step coverage and prevents damage of polyimide from rubbing.

DESCRIPTION OF THE PRIOR ART

A thin film transistor liquid crystal display (TFT-LCD) consists of two sheets of glass seperated by a sealed-in liquid crystal material. A TFT array substrate, one of glass sheets, has a plurality of pixels each including a pixel electrodes and a thin film transistor. Gate lines and data lines of matrix type are formed between the individual pixels. A color filter substrate, another glass sheet, has color filters that they each face each electrode of the TFT array substrate, being covered with common electrodes. The color filter has commonly three colors, red, green and blue.

A typical prior art color filter substrate of an LCD is described below with reference to the accompanying drawings.

FIG. 1 is a cross-sectional view of a typical prior art color filter substrate, where reference 1 is a substrate, 2 is a color filter, 3 is a overcoat layer, 4 is a common electrode and 5 is a black matrix BL. The substrate 1, the over coating layer 3 and the common electrode 4 are made of transparent material, while the black matrix 5 is made of opaque material.

The typical color filter substrate as shown in this figure, is produced through the successive processes below.

The process is begun by forming a black matrix 5 using opaque metal such as Al or Cr on a transparent glass substrate 1. Next, three color filters 2, each having a different color, are formed between the black matrixes, each overlapping one ends of the adjacent black matrix 5. The thus-formed color filters 2 are thick, so that there occur steps. To compensate these steps, an overcoat layer 3 is then deposited on the black matrix pattern. An common electrode 4 is then formed by depositing a transparent conducting material. These successive processes produce the color filter substrate as a final product.

However, when employing this color filter substrate to the LCD device, the common electrodes of the color filter substrate should be connected to the TFT array substrate at some short-circuit areas. In this case, the transparent conductive material for the common electrode has considerably high sheet resistance. This may generate a distortion of the common signal which brings a crosstalk as well as a difficulty in maintaining a uniform resistance. Four short-circuit areas or more are required to prevent these phenomena, so that it presents a problem of the process complexity.

Further, the black matrix made of metal is deposited just above the transparent glass substrate, so that the light passed through the glass substrate is directly reflected at the black matrix. Accordingly, the reflection rate at the surface of the panel increases, thereby deteriorating a picture quality.

Moreover, a formation process of a coating film has been added to the conventional methods to reduce the reflection rate at the surface of the panel. However, this attempt has been without any noticeable result and it, on the contrary, brings process complexity as well as problems in process time and manufacturing costs.

SUMMARY OF THE INVENTION

In view of the above, it is an object of the present invention to reduce sheet resistance of the common electrode and eliminate crosstalk without additional process.

It is another object to reduce a light reflection rate at the surface of the panel by reducing the light reflected at black matrix made of metal such as Cr without additional process.

It is still another object to improve a step coverage, still permitting an effect of reducing the sheet resistance of the common electrode, thereby preventing the polyimid damage or taking-off phenomenon caused by rubbing the polyimid which is a composition of the liquid crystal orientation layer.

To achieve the above-mentioned object, according to a preferred embodiment of the present invention, a color filter substrate is comprised of a transparent insulating substrate; a plurality of color filters; a common electrode made of transparent conducting material; and a black matrix made of opaque conductive material, wherein the common electrode and black matrix are electrically connected each other, and the black matrix is deposited on the color filter.

In this construction, the high sheet resistance of the common electrode can be reduced by connecting the common electrode to the black matrix having a low sheet resistance compared with the common electrode. In addition since the black matrix is deposited on the color filter, the light passed through the substrate is mostly absorbed during transmitting the color filter and the minute light is only arrived at the black matrix, so that the light reflection rate of the panel can be reduced.

In this color filter substrate, the overcoat layer is provided between the color filter substrates to compensate the gap therebetween.

That is, the first embodiment of this invention as shown in FIG. 2, a plurality of the color filters 2 are deposited on the transparent insulating substrate 1, at regular intervals, on which the overcoat layer 3 made of opaque insulating material and the common electrode 4 made of transparent conductive material are deposited. On the common electrode 4, the black matrix 5 is deposited, covering the space between the adjacent color filters 2. In particular, as shown in this figure, the common electrode 4 is electrically connected to the black matrix 5 under which the color filters 2 are sited, enabling the objects of this invention to be achieved.

In the second embodiment as shown in FIG. 4, a plurality of color filters 2 are formed on the transparent insulating substrate 1, on which an overcoat layer 3 made of transparent insulating material is deposited. The construction as far as here is equal to the first embodiment. However, it is different from the first embodiment in that the black matrix 5 made of opaque conductive material is formed on the overcoat layer 3, covering the space between the adjacent color filters 2, and the common electrode 4 made of transparent conductive material covers the entire overcoat layer 3. Note that the plurality of the color filters 2 can be formed at regular intervals as shown in FIG. 4, while they can be formed to be overlaid with each other as shown in FIG. 5. Moreover, it is also possible that they are formed without any overlap area as well as any intervals therebetween.

The third embodiment is the same as the first and the second embodiments in that a plurality of the color filters 2 are formed at regular intervals on the transparent insulating substrate 1, as shown in FIG. 7. It is however different in that no overcoat layer 3 is deposited and the common electrode 4 made of transparent conductive material is deposited on the color filters 2, on which the black matrix 5 made of opaque conducting material is formed covering the space between the adjacent color filters 2. This embodiment can also achieve the objects of this invention by which the common electrode 4 and the black matrix 5 are electrically connected each other and the black matrix 5 is formed on the color filters 2.

Hereinafter, the method of fabricating the color filter substrate of this invention is described with reference to FIGS. 8A to 8D.

The process is begun with patterning the color filters 2 on the transparent insulating substrate 1 made of glass or plastic, uniformly, using a photolithography method. Each color filter 2 has one color of three colors, red, green and blue, and must be arrayed to close by the other color filter having a different color. In addition, an arrangement of the color filters 2 on the color filter substrate 1 should be correspond to that of the pixel electrodes on the TFT array substrate which faces the color filter substrate, with respect to size and interval. Here, to be noted that the color filters 2 can be arranged in a closely spaced apart relation to one another as shown in FIG. 2, or overlaid, or contacted with each other, as the second embodiment.

Next, differently from the first and the second embodiments, the common electrode and the black matrix are directly produced without an overcoat-formation step. However, the common electrode can serve as the overcoat layer in this embodiment. Further, as shown in FIG. 9, there is proposed the LCD color filter substrate in which more ITO than any other embodiment is deposited on the common electrode under which the black matrix is formed.

In FIG. 10 showing a fifth embodiment of this invention, there are also proposed a color filter substrate which is comprised of the transparent insulating substrate 1, a plurality of the color filters 2 at regular intervals on the color filter substrate 1, the overcoat layer 3 made of transparent insulating material covering the transparent insulating substrate 1 and the color filters 2, the buffer layer 6 on the overcoat layer 3, the black matrix 5 made of opaque conductive material on the buffer layer 6 covering the space between the adjacent color filters 2, the ITO layer 4 on the black matrix 5. The method of fabricating such a color filter substrate is also provided.

In this embodiment, it is desirable that the color filter substrate is made of glass or plastic, each color filter exhibits one of red, green and blue, and the overcoat layer is made of acrylic resin or polyimide resin.

It is also desirable that the overcoat layer is deposited to be 1 μm to 10 μm thick just by the coating step, using no mask.

It is still desirable that the buffer layer is made of ITO, SiNx or inorganic material, and the common electrode is made of ITO and its thickness is about 100 Å to 2,000 Å.

Moreover, the black matrix is desirable to be made of Cr.

BRIEF DESCRIPTION OF THE DRAWINGS

FIGS. 8A to 8D are cross-sectional views showing the successive processes of manufacturing the color filter substrate of FIG. 7;

DETAILED DESCRIPTION OF THE PREFERRED EMBODIMENTS

Each preferred embodiment of the present invention and each comparative example are described below to compare the present invention with the prior art.

Embodiment 1

There is a transparent insulating substrate on which a plurality of the color filters are formed at regular intervals. The overcoat layer made of transparent insulating material is deposited on the substrate, filling the gaps between the adjacent color filters. The black matrix is formed on the overcoat layer, covering the gap between the adjacent color filters.

Figure 1:
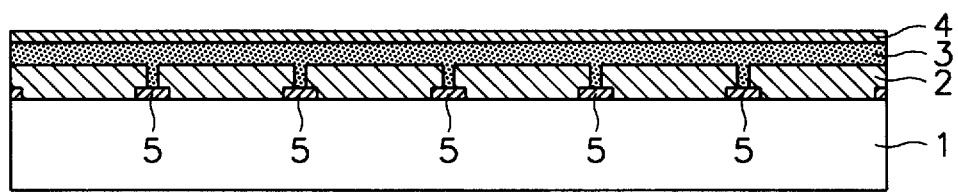
FIG. 1 is a cross-sectional view of a color filter substrate for a prior art LCD.
Figure 2:
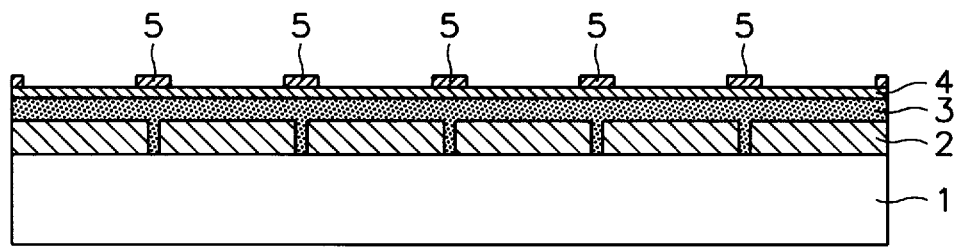
FIG. 2 is a cross-sectional view of a color filter substrate of a first embodiment of this invention.

FIG. 2 is a cross-sectional view of the color filter substrate of this embodiment and FIGS. 3A to 3D are cross-sectional views showing the successive processes of manufacturing the same.

Hereinafter, the method of fabricating the color filter substrate of this embodiment is described with reference to FIGS. 3A to 3D.

The process is begun with forming the color filters 2 at regular intervals on the transparent insulating substrate 1 made of glass or plastic, uniformly, using a photolithography method. Each color filter 2 exhibits one of red, green and blue and should be arrayed to close by another exhibiting a different color. In addition, an arrangement of the color filters on the color filter substrate should be correspond to that of the pixel electrodes on the TFT array substrate which faces the color filter substrate, with respect to size and interval.

Figure 3A:
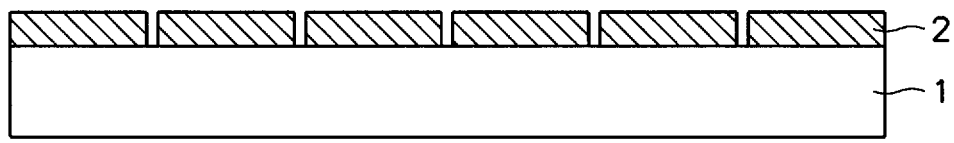
FIGS. 3A to 3D are cross-sectional views showing the successive processes of manufacturing the color filter substrate of FIG. 2.
Figure 3B:
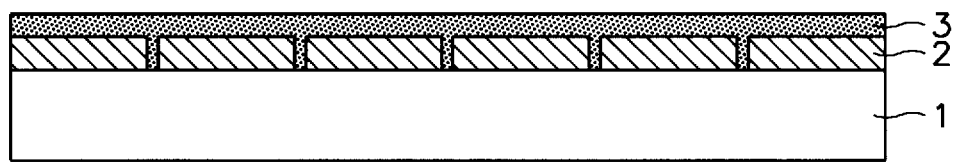

Next, as shown in FIG. 3B, the overcoat layer 3 made of transparent insulating material is deposited on the substrate 1 on which the color filters 2 are already formed, filling the gap between the adjacent color filters 2. The resultant overcoat layer 3 covers the entire color filters 2, compensating prominence and depression of the color filter 2. Further, it prevents the color filters 2 from degradation, enabling a later layer to be deposited with high adhesive strength.

Figure 3C:
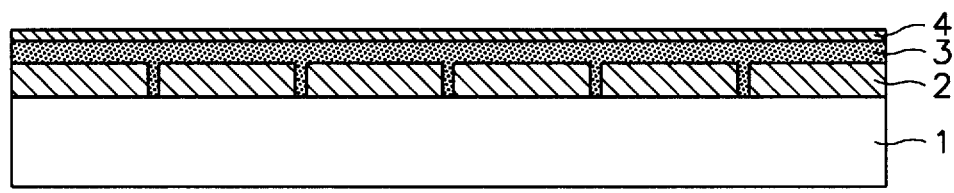

As shown in FIG. 3C, the common electrode 4 made of transparent conducting material such as ITO, etc is then deposited on the overcoat layer 3.

Figure 3D:
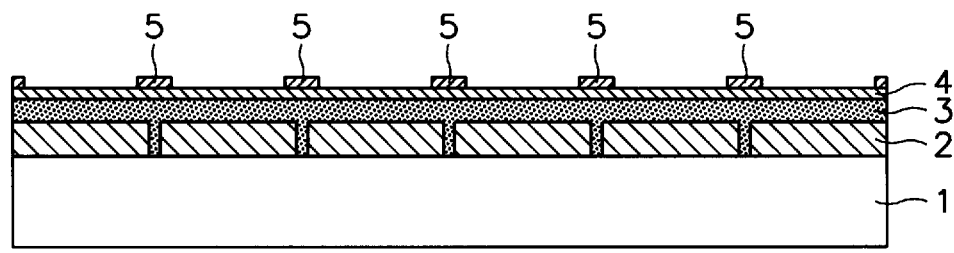

The above-mentioned processes are completed by forming the black matrix 5 on the common electrode 4 as shown in FIG. 3D.

In this color filter substrate, the black matrix pattern is produced by depositing an opaque conducting material such as Cr or Al using the photolithography method to cover the gap between the adjacent color filters 2. It is desirable to make the black matrix 5 of a material having a sheet resistance more than one-tenth lower than that of the common electrode. It is also desirable that the black matrix area is formed to be five times greater than the gap between the adjacent color filters 2.

Embodiment 2

This color filter substrate is constructed in the same manner as the first embodiment, except that the black matrix 5 is formed on the overcoat layer 3 covering the gap between the adjacent color filters through the overcoat layer 3, and being covered with the common electrode 4 made of transparent conducting material.

Figure 4:
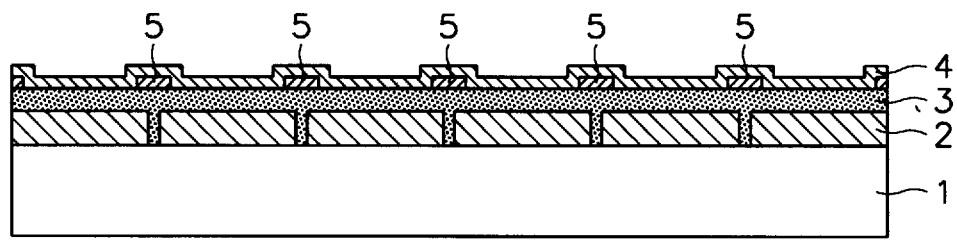
FIGS. 4 and 5 are cross-sectional views of a color filter substrate of a second embodiment of this invention.
Figure 5:
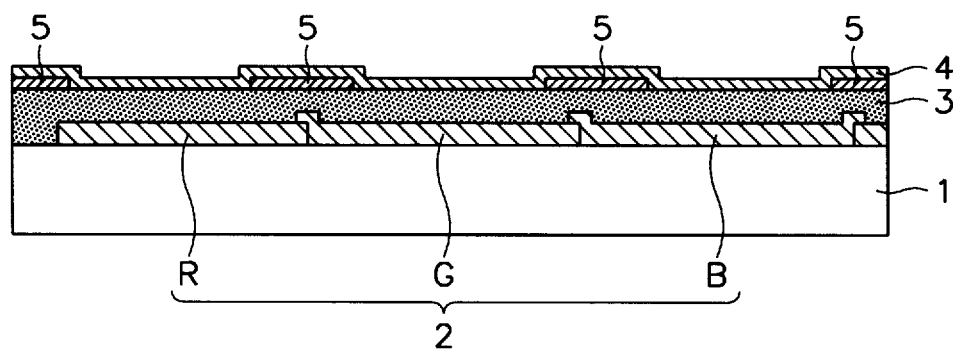

FIGS. 4 and 5 are cross-sectional views of a color filter substrate of this embodiment and FIGS. 6A to 6D are cross-sectional views showing the successive processes of manufacturing the same.

Figure 6A:
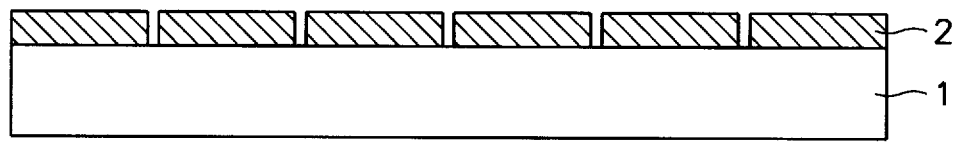
FIGS. 6A to 6D are cross-sectional views showing the successive processes of manufacturing the color filter substrate of a second embodiment of this invention.

As shown in FIG. 6A, the color filter pattern is formed by firstly coating a red photoresist of 1.2 μm thick on the transparent insulating substrate 1 so as not to be oxidized, exposing to the light, developing, and then post-baking. Each color filter 2 exhibits one of red, green and blue, and such filters should be arrayed in a closely spaced apart relation to one another exhibiting a different color. In addition, an arrangement of the color filters on the color filter substrate should be correspond to that of the pixel electrodes on the TFT array substrate which faces the color filter substrate, with respect to size and interval.

These are produced in the order of red, green and blue filters through each photoresist-coating step and each patterning step. Note that in a overlap structure as shown in FIG. 5, the color filters 2 are formed in such a manner that a green filter G overlays a red filter R, and a blue filter B overlays the green filter G and the red filter R.

Figure 6B:
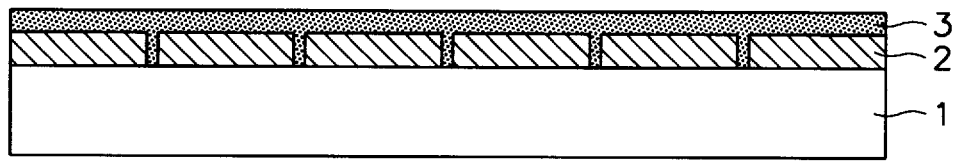

Next, as shown in FIG. 6B, the overcoat layer 3 is produced by depositing a transparent insulating material to be 3 μm thick using no mask. This overcoat layer 3 is to prevent degradation of the color filter 2 and to improve adhesive strength of a later deposition layer as well as to compensating a height difference between the color filter 2 and the substrate 1.

Figure 6C:
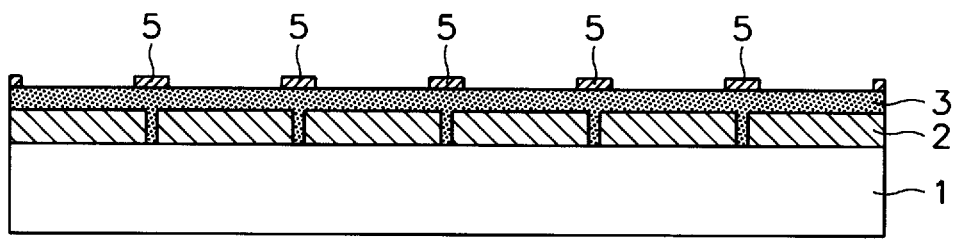
Figure 6D:
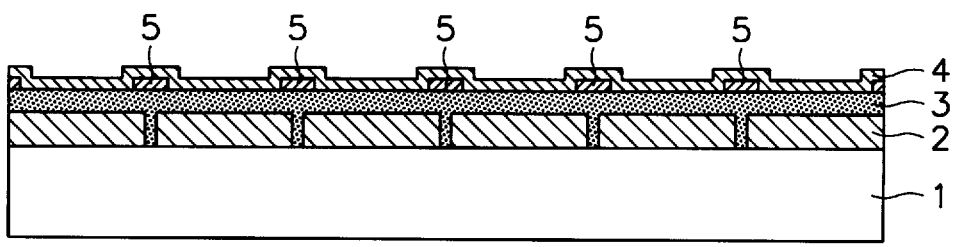

Different from the first embodiment, the black matrix 5 of about 1,500 Å to 2,000 Å thick is formed on the overcoat layer 3 as shown in FIG. 6C. The black matrix 5 is produced by depositing an opaque conductive material such as chrome or aluminum and patterning the deposited material using a photolithography method to cover the gap between the adjacent color filters. It is desirable to make this black matrix 5 of a material having a sheet resistance more one-tenth lower than that of the common electrode 4. It is also desirable that its area is five times more of the gap between the adjacent color filters.

The process of this embodiment is completed by the formation of common electrode 4. This common electrode 4 is produced by depositing a transparent conductive material such as ITO on the overcoat layer 3 to be 400 Å to 1,000 Å thick.

Embodiment 3

In this color filter substrate, there is a transparent insulating substrate on which a plurality of color filters are formed. The common electrode made of transparent conductive material covers the substrate on which the color filters are already formed, and a black matrix made of opaque conductive material on the common electrode covers the gap between the adjacent color filters through the common electrode.

Figure 7:
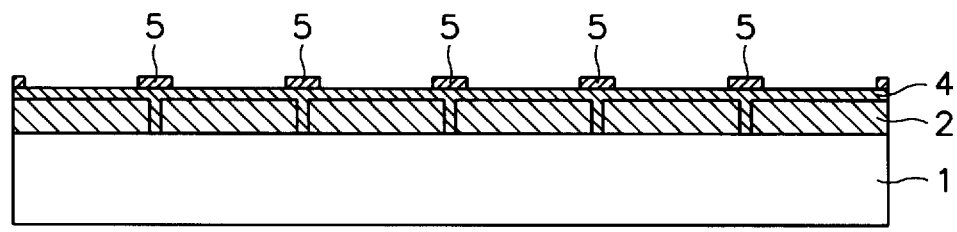
FIG. 7 is a cross-sectional view of a color filter substrate of a third embodiment of this invention.

FIG. 7 is a cross-sectional views of this color filter substrate and FIGS. 8A to 8D are cross-sectional views showing the successive processes of manufacturing the same.

Figure 8A:
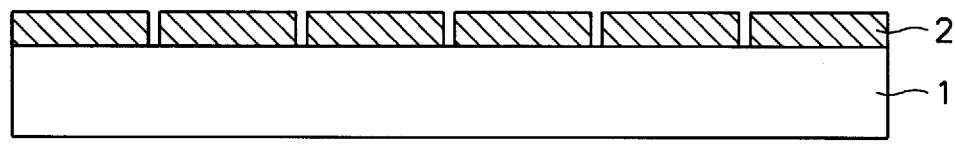
Figure 8B:
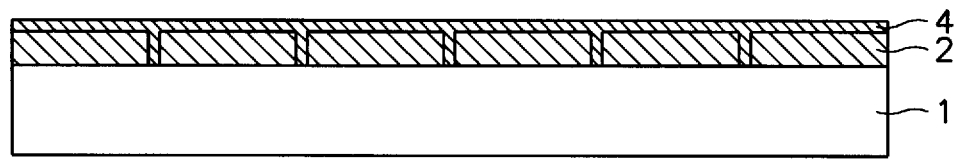
Figure 8C:
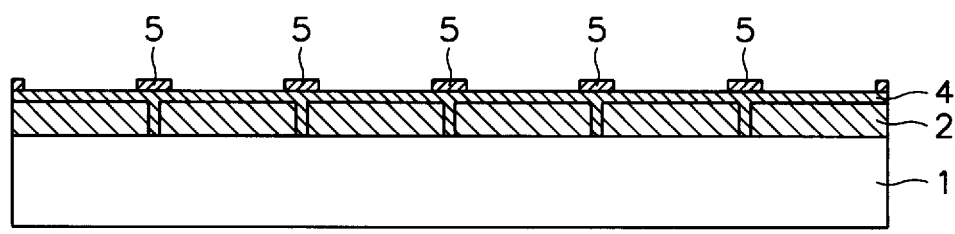

As shown in FIG. 8C, a common electrode 4 made of transparent conductive material such as ITO is deposited, filling the gap between the adjacent color filters 2. This common electrode 4 has a thickness enough to complement height differences between the color filters 2 and the substrate 1 or unevenness of the color filters 2.

As a final step, a black matrix 5 is formed. This black matrix is produced by which an opaque conductive material such as chrome or aluminum is firstly deposited on the entire common electrode 4, and then patterned the deposited material using a photolithography method, The resultant black matrix 5 covers the gap between the adjacent color filters 2 through the common electrode 4. In this embodiment, it is desirable that the black matrix 5 is made of a material having a sheet resistance more one-tenth lower than that of the common electrode 4, and its area is five times more of the gap between the adjacent color filters.

Embodiment 4

In this embodiment, there is a transparent insulating substrate on which a plurality of color filters are formed. The common electrode made of transparent conductive material covers the substrate on which the color filters are already formed, and a black matrix made of opaque conductive material on the common electrode covers the gap between the adjacent color filters through the common electrode. An ITO layer covers the entire substrate forming the black matrix thereon.

FIGS. 8A to 8C are cross-sectional views showing the successive processes of manufacturing of this color filter substrate.

Figure 9:
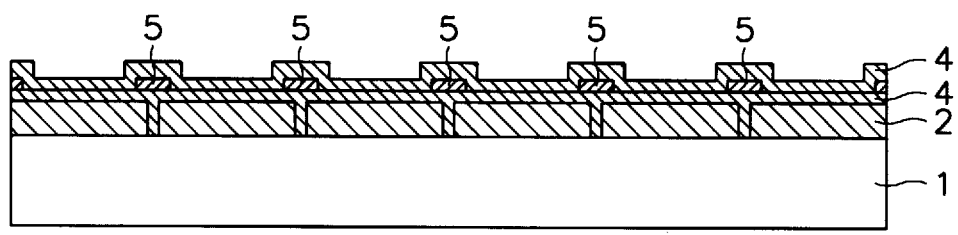
FIG. 9 is a cross-sectional view of a color filter substrate of a fourth embodiment of this invention.

In this embodiment, as shown in FIG. 9, a common electrode 4 made of transparent conductive material such as ITO is deposited, filling the gap between the adjacent color filters 2. This common electrode 4 has a thickness enough to complement height differences between the color filters 2 and the substrate 1 or unevenness of the color filters 2.

As a final step, a black matrix 5 is formed. This black matrix is produced by which an opaque conductive material such as chrome or aluminum is firstly deposited on the entire common electrode 4, and then patterned the deposited material using a photolithography method, The resultant black matrix 5 covers the gap between the adjacent color filters 2 through the common electrode 4. In this embodiment, it is desirable that the black matrix 5 is made of a material having a sheet resistance more one-tenth lower than that of the common electrode 4, and its area is five times more of the gap between the adjacent color filters.

Embodiment 5

In this color filter, there is a transparent insulating substrate on which a plurality of color filters are formed at regular intervals. An overcoat layer covers the color filters, filling the space between the adjacent color filters. An buffer layer is provided on the overcoat layer, on which a black matrix is formed. An ITO layer is deposited on the buffer layer forming the black matrix thereon.

Figure 10:
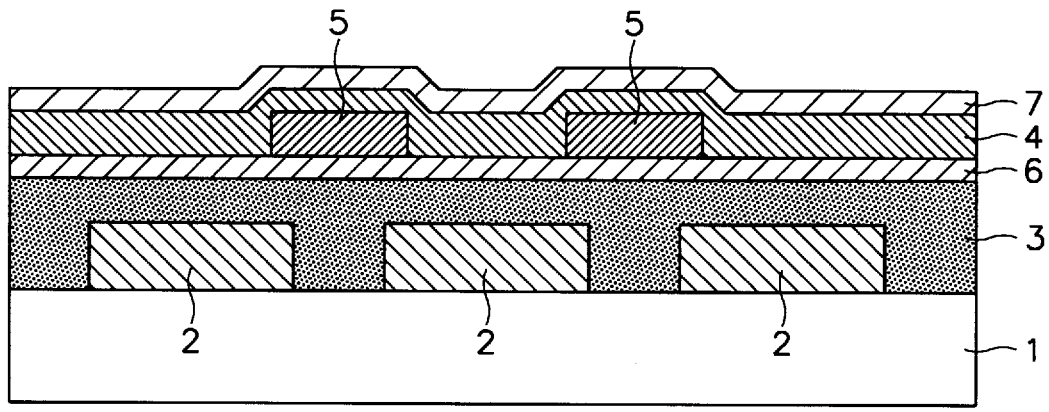
FIG. 10 is a cross-sectional view of a color filter substrate of a fifth embodiment of this invention.

FIG. 10 is a cross-sectional view of this color filter substrate.

As shown in this figure, a red photoresist of 1 μm to 1.2 μm thick on the transparent insulating substrate 1 so as not to be oxidized, exposing to the light, developing, and then post-baking. Green filter and blue filter are manufactured in the same manner as the red filter.

The overcoat layer made of acrylic resin or polyimide resin is then deposited to be about 3 μm using no mask. The deposition of ITO is then conducted using a sputtering method to create a buffer layer of 400 Å to 1,000 Å, and next deposition of chrome is followed to create a black matrix of 1,500 Å to 2,000 Å.

The process of this embodiment is completed by forming the common electrode made of ITO on the black matrix pattern to be 1,200 Å to 2,000 Å.

Embodiment 6

This color filter substrate is constructed in the same manner as the fifth embodiment, except that the buffer layer is made of SiNx instead of ITO.

Comparative Example

A black matrix pattern is obtained by depositing a transparent metal such as Al or Cr on a transparent glass substrate. Three color filters 2, each having a different color, are formed between the black matrix, each end of each filter overlapping the adjacent black matrix. These color filters are very thick, so that there occurs steps from the substrate. To compensate the steps, the overcoat layer is then formed on the substrate already forming the color filters 2. The deposition of transparent conductive material is finally applied on the substrate to create a common electrode 4.

From the above-described embodiments 1 to 5 and the comparative example, the resultant common resistances are as follows.

| glass size (") | Prior art (ohm) | Embodiments of this invention (ohm) | | | | | |
|---|---|---|---|---|---|---|---|
| | | 1 | 2 | 3 | 4 | 5 | 6 |
| 9.4 | 120 | 18 | 18 | 18 | 18 | 13 | 18 |
| 10.4 | 350 | 135 | 23 | 23 | 23 | 14 | 23 |

This table shows the resultant common resistances of the prior art and the present color filter substrates. These resistances are measured along a diagonal line of each substrate using a multitestor. This table verifies that the resistance values of the respective color filter substrates of this invention are about one-seventh of that of the prior art.

Further, the luminescence characteristic of the 9.4" substrate of this invention is 4.86 times of the prior art substrate under a darkroom, while two times under 100 LUX.

The crosstalk of this invention is remarkably low as 3 to 5% compared with the prior art showing 20 to 25%.

Effective

In this invention, the common electrode 4 made of transparent conductive material is connected to the black matrix made of opaque conductive material. Cr, opaque metal, which is a material of the black matrix, has a sheet resistance remarkably lower than ITO, transparent conductive material, which is a material of the common electrode, and thus total sheet resistance of this invention is reduced compared with the prior art.

The prior art color filter substrate has a problem that contrast is lowered by which the black matrix is directly formed on the substrate and thus the light passed through the transparent substrate is reflected at the black matrix.

Whereas, this color filter substrate improves this disadvantage in such a manner that the black matrix is deposited on the color filter and thus the light passed through the gap between the adjacent color filter is only reflected from the black matrix and the remaining light is mostly absorbed by the black matrix and the minute light is only arrived at the black matrix, so that the light reflection rate of the panel can be reduced. Further, the common electrode compensates a high sheet resistance and reduces a reflection rate of the surface of the panel and a crosstalk.

Particularly, as the embodiments of this invention, it is desirable that the black matrix area is formed to be five times more of the gap between the adjacent color filters.

On the other hand, the first embodiment has a possibility that the black matrix 5 comes off the common electrode 4 because the black matrix 5 is formed on the common electrode 4 as an upper-most layer of the substrate. Such separated fragments of the matrix brings serious problems that, if they exist between the TFT array substrate and the color filter substrate, the data line (not shown) and the common electrode may be short-circuited or the pixel electrode (not shown) and the common electrode may be short-circuited. In the second embodiment, however, there is little such a possibility because the common electrode 4 is formed on the black matrix 5 and thus the fragments of the black matrix 5 still remained after the formation of the black matrix pattern, covers the common electrode 4.

Especially, if the black matrix is formed on the common electrode as the first embodiment, the black matrix may come off the substrate during the rubbing process due to poor adhesion of the orientation layer. However, provided of the construction as the second embodiment in which the common electrode is formed on the black matrix, there is little such a possibility.

In the second embodiment shown in FIG. 4 and FIG. 5, as the first embodiment, the black matrix 5 made of opaque conductive material is electrically connected to the common electrode 4 made of transparent conductive material, so that the total sheet resistance is reduced. Further, since the black matrix is formed on the color filters 2, the reflection rate of the surface of the panel is reduced.

In the third embodiment shown in FIG. 7, as the first and the second embodiments, the black matrix 5 made of opaque conductive material is electrically connected to the common electrode 4 made of transparent conductive material, so that the total sheet resistance is reduced. Further, since the black matrix is formed on the color filters 2, the reflection rate of the surface of the panel is reduced. However, in case that the Cr black matrix of about 2,000 Å thick is formed on the common electrode making a nearly right angle with the common electrode and the polyimide 7 is printed on such a black matrix as indicated in FIG. 10, there generate disadvantages that the step coverage to both edges of the black matrix is poor and the polyimide formed on both edges of the black matrix is apt to come off. Accordingly, liquid crystal at the polyimide-off substrate is likely to operate incorrectly and the minute light leak is generated at both edges of the pixel. Therefore, to remove the Cr crack by the coefficient of heat expansion when an additional ITO layer is formed on the black matrix and the Cr black matrix is formed on the overcoat layer, the buffer layer is provided between the overcoat layer and the black matrix using ITO or SiNx or inorganic material. Forming the black matrix on the color filters can compensate a high sheet resistance of the common electrode, and forming the ITO layer serving as the buffer layer achieves a good step coverage between the Cr black matrix and the polyimide and prevents the polyimide-off phenomenon as well as compensates more and more a high sheet resistance of the common electrode. As a result, any additional process is required, and the defects of the polyimide-off substrate and the light leak can be compensated.

What is claimed is:

1. A color filter substrate for a liquid crystal display comprising:
   a transparent insulating substrate;
   a plurality of color filters disposed on the substrate and evenly spaced apart from one another;
   an overcoat layer of transparent insulating material disposed over the color filters and exposed portions of the substrate forming individual color filters thereon;
   a common electrode of transparent conductive material disposed on the overcoat layer; and
   a black matrix of opaque conductive material disposed on the common electrode covering each gap between adjacent spaced apart color filters, the matrix having a width at least five times wider than the gap.

2. A color filter substrate of claim 1, in which the common electrode is made of indium tin oxide (ITO).

3. A color filter substrate of claim 2, in which the black matrix is made of chrome (Cr) or aluminum (Al).

4. A color filter substrate of claim 2, in which the black matrix has a sheet resistance at least one-tenth lower than that of the common electrode.

5. A color filter substrate for a liquid crystal display comprising:
   a transparent insulating substrate;
   a plurality of color filters disposed on the substrate and evenly spaced apart from one another;
   an overcoat layer of transparent insulating material disposed over the color filters and exposed portions of the substrate forming individual color filters thereon;
   a black matrix of opaque conductive material disposed on the overcoat layer covering each gap between adjacent spaced apart color filters, the matrix having a width at least five times wider than the gap; and
   a common electrode of transparent conductive material disposed on the overcoat layer and covering the black matrix thereon.

6. A color filter substrate of claim 5, in which the black matrix is made of Cr or Al.

7. A color filter substrate of claim 6, in which the common electrode is made of ITO.

8. A color filter substrate of claim 7, in which the black matrix has a sheet resistance at least one-tenth lower than that of the common electrode.

9. A color filter substrate for a liquid crystal display comprising:
   a transparent insulating substrate;
   a plurality of color filters disposed on the substrate and evenly spaced apart from one another;
   a common electrode of transparent conductive material disposed over the color filters and exposed portions of the substrate forming individual color filters thereon; and
   a black matrix of opaque conductive material disposed on the common electrode covering each gap between the adjacent color filters, the matrix having a width at least five times wider than the gap.

10. A color filter substrate of claim 9, in which the common electrode is made of ITO.

11. A color filter substrate of and claim 10, in which the black matrix is made of Cr or Al.

12. A color filter substrate of claim 10, in which the black matrix has a sheet resistance at least one-tenth lower than that of the common electrode.

13. A color filter substrate of claim 9, in which the common electrode, on which the color filters is formed, includes an additional ITO layer.

14. A color filter substrate for a liquid crystal display comprising:
   a transparent insulating substrate;
   a plurality of color filters disposed on the substrate and separated from one another by a regular gap;
   an overcoat layer of transparent insulating material disposed over the color filters and exposed portions of the substrate forming individual color filters thereon;
   a buffer layer of transparent conductive material disposed on the overcoat layer;
   a black matrix of opaque conductive material disposed on the buffer layer covering each gap between adjacent color filters, the matrix having a width at least five times wider than the gap; and
   a common electrode disposed on the buffer layer and covering the black matrix thereon.

15. A color filter substrate of claim 14, in which the buffer layer is made of ITO.

16. A color filter substrate of claim 14, in which the buffer layer is made of SiNx or inorganic material.

17. A color filter substrate of claim 14, in which the buffer layer is 10 Å to 2,000 Å thick.

18. A color filter substrate of claim 14, in which the black matrix is made of Cr.

19. A color filter substrate of claim 14, in which the common electrode is made of ITO.

20. A color filter substrate for a liquid crystal display comprising:
   a transparent insulating substrate;
   a plurality of color filters disposed on the substrate, each color filter overlapping an adjacent color filter;
   an overcoat layer of transparent insulating material disposed on the color filters;
   a black matrix of opaque conductive material disposed on the overcoat layer covering each area where said color filters overlap; and
   a common electrode of indium tin oxide (ITO) disposed on the overcoat layer and covering the black matrix thereon.

21. A color filter substrate of claim 20, in which the black matrix has a sheet resistance at least one-tenth lower than that of the common electrode.

22. A color filter substrate of claim 20, in which the black matrix is made of chrom (Cr) or aluminum (Al).

* * * * *